Aug. 25, 1964 — J. B. FREED — 3,146,286
METHOD FOR MAKING LINED VALVES
Original Filed June 14, 1954
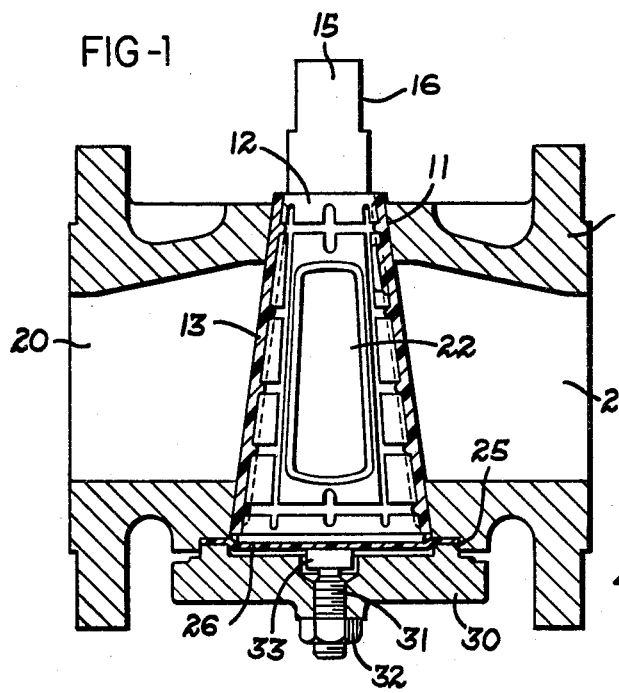
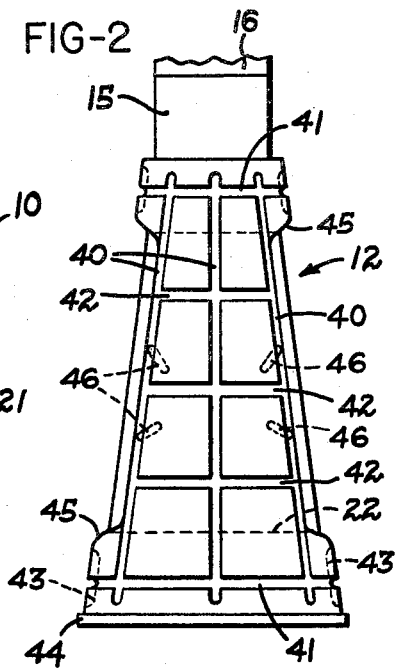
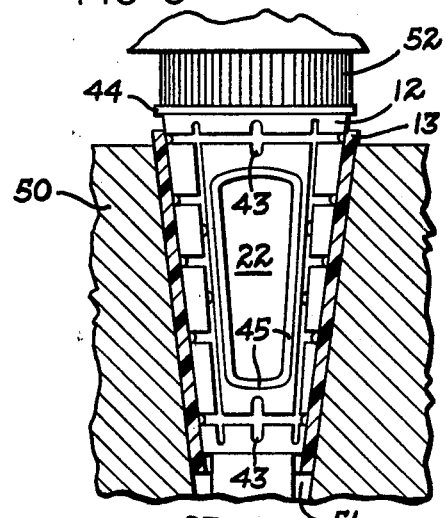
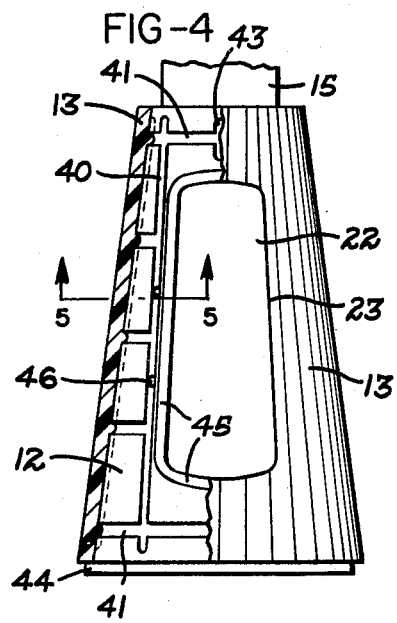
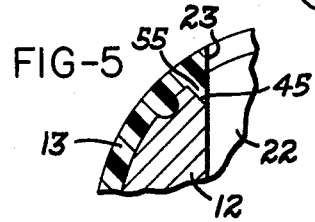
INVENTOR.
JACOB B. FREED
BY Marechal, Biebel, French & Bugg
ATTORNEYS 3,146,286
METHOD FOR MAKING LINED VALVES
Jacob B. Freed, Dayton, Ohio, assignor to The Duriron Company, Inc., Dayton, Ohio, a corporation of New York
Continuation of application Ser. No. 707,807, Jan. 8, 1958, which is a division of application Ser. No. 436,282, June 14, 1954. This application Aug. 28, 1962, Ser. No. 219,989
8 Claims. (Cl. 264—274)

This invention relates to a method for making plug valves, and more particularly to a method for making lined valves of the type employed for handling corrosive fluids and the like.

It is the primary object of the invention to provide a method for making a lined plug valve of improved and novel characteristics wherein the liner is secured on the plug to turn therewith in the bore in the valve body, and more particularly wherein the valve is so formed and assembled on the plug as in effect to form therewith a single unit which not only assures proper sealing in use but which also is readily fabricated as a unit either for installation in a new valve body or as a replacement unit for an existing valve.

Another object of the invention is to provide a method of fabricating a plug for a lined plug valve in accordance with which the liner and plug are preassembled under heat and pressure in such manner as to form effectively a single unit for subsequent assembly in the bore of the valve body with the liner held against both axial and angular movement with respect to the plug for turning therewith in the body.

It is also an object of the invention to provide a method of fabricating a plug valve as outlined above wherein the plug is formed of metal with indentations in the surface thereof and the liner is formed of a thermoplastic material having a coefficient of thermal expansion substantially greater than that of the plug, and in which the liner is first formed to a smaller size than the plug and is then heated to an elevated temperature with resulting expansion, and the plug is forced into the heated liner under high pressure causing the material of the liner to shrink into the indentations in the plug as the liner cools and thus to lock the liner against both axial and angular movement with respect to the plug.

Further objects and advantages of the invention will be apparent from the following description, the accompanying drawing and the appended claims.

In the drawing—

FIG. 1 is a sectional view through a lined plug valve constructed in accordance with the present invention;

FIG. 2 is a detail elevational view of the unlined plug for the valve of FIG. 1;

FIG. 3 is a sectional view illustrating a step in the assembly of the plug and liner of FIGS. 1 and 2;

FIG. 4 is an elevational view, partly broken away, showing the completed plug and liner unit for the valve of FIG. 1; and FIG. 5 is an enlarged fragmentary section on the line 5—5 of FIG. 4.

Referring to the drawing, which illustrates a preferred embodiment of the invention, the valve body 10 in FIG. 1 has a transverse tapered bore 11 for receiving the frusto-conical plug 12 and complementary liner 13. At the upper end of the plug is a stem portion 15 provided with flats 16 on each side thereof for interlocking engagement with an operating handle. The valve body 10 is formed with flow passages 20 and 21 adapted to be connected upon turning of the plug by the transversely extending port 22 in the plug, and the liner 13 is provided with similar ports or flow passages 23.

The lower end of the valve body 10 is provided with an enlarged counterbore 25 to receive a thrust diaphragm 26 and cap 30, which is bolted to the body in the usual way. The cap 30 carries an adjustable stud 31 having a lock nut 32 and engaging a thrust plunger 33 which has direct connection with the thrust diaphragm 26 and through the diaphragm with the large end of the plug 12 to provide for maintaining the desired pressure on the plug and liner in the direction of the small end of the bore 11.

The plug 12 and liner 13 forms a unit, with the liner being secured on the plug against both angular and axial movement with respect to the plug. As shown in FIG. 2, the metallic plug is formed with a plurality of grooves 40 which extend axially over the major portion of the length of its tapered surface. These grooves 40 are connected by circumferential grooves 41 beyond the ends of the port 22 and also by partial circumferentially extending grooves 42 in the side portions of the plug between the two ends of the port. Each groove 41 is also shown as provided with a pair of short connecting axial grooves 43 opposite the port 22. These several grooves are shown as substantially semi-cylindrical in section, and satisfactory results have been obtained with a radius of ⅛ inch for each groove in a plug for a 3-inch valve wherein the tapered portion of the plug is approximately 4 inches in length and 3 inches in diameter at its larger end.

The large end of the plug is also shown as having a circumferential shoulder 44 overhanging the adjacent end of the tapered portion of the plug. The plug 12 has a chamfered portion 45 surrounding each end of the port 22 and outlining the port, and in a plug of the above dimensions, satisfactory results are obtained with a ⅛ inch by 45° chamfer. In addition, each of the grooves 40 adjacent the port 22 is shown as provided with a pair of relatively shallow bores 46 extending into the plug at an angle of 45° to the tapered side of the plug and in a direction substantially parallel with the port 22. For example, each of these bores 46 may be ⅛ inch in diameter and ¼ inch in depth.

FIG. 3 shows the assembly of the plug 12 with the liner 13. As pointed out in the copending applications of Robert C. Schenck, Serial No. 146,645, filed February 28, 1950, now Patent No. 2,713,987 and Serial No. 176,600, filed July 29, 1950, now Patent No. 2,729,420, both assigned to the same assignee as this application, highly satisfactory results have been obtained in valves of the illustrated type with liners formed of a plastic material from the group consisting of polyethylene and derivatives thereof having relatively high coefficients of thermal expansion such particularly as the polytetrafluoroethylene material commercially available under the name of Teflon. The liner 13 is initially formed as a frusto-conical sleeve having the same internal and external tapers as the plug 12 and bore 11 respectively, and this liner is fabricated in the usual manner by molding and sintering the plastic material.

The polyethylene materials of the above type have a substantially greater coefficient of thermal expansion than the metals such as stainless steel commonly used for the plug and body in lined valves, and the liner 13 is accordingly initially made of such smaller dimensions than the plug at room temperature that when the liner is heated to a range at which it is readily deformable, it can be force-fitted into assembled relation on the plug. For example, if the maximum diameter of the tapered part of the plug is 3.0625 inches, the liner may have an inner diameter at its largest end of 2.835 inches and a wall thickness of the order of 0.275 to 0.30 inch. Also, preferred results are obtained in the above example with the liner initially somewhat longer than the tapered portion of the plug, for example about 1.25 inches.

In the next step in the production of the plug and valve unit, the liner is heated as noted to a temperature at which it is readily plastic, and this in the case of the above polyethylene materials will be at a temperature of the order of 700° F. which is substantially the same as the sintering temperature employed in the initial forming of the liner. Then as shown in FIG. 3, the heated liner is immediately inserted in a die 50 having a tapered mold cavity 51 prepared to receive the heated liner snugly therein. More specifically, in the initial forming of the liner, and before it is heated, it is desirably machined to such outer diameter at room temperature that it will expand to substantially the same proportions as the cavity 51 when heated to adequately plastic condition, this expansion in the above specific example being of the order of 3/16 inch.

As soon as the heated liner is inserted in the cavity 51, the plug 12 is inserted in the liner, which may be done with the plug at substantially room temperature. Pressure is then promptly applied to the large end of the plug, represented by the ram 52 in FIG. 3, to force the plug into the liner and to force both the plug and liner into the cavity 51. This pressure should be relatively high, namely of the order of 15 to 30 tons, and this applied pressure is maintained while the liner cools to room temperature. The result is first to force the liner material to flow into and fill the several grooves 40–43, chamfers 45 and bores 46 on the sides of the plug as the liner material is compressed in the cavity under the combined axial and radial pressure effective thereon, and this is true whether or not the plug is provided with the shoulder 44. Then as the liner cools, it shrinks further onto the plug in such manner as to maintain the liner material filling these several indentations in the surface of the plug.

When the liner has thus cooled into axially and angularly interlocked relation with the plug, the liner material is cut away opposite the ends of the plug port 22, but this operation is carried out parallel with the direction of the port so that the liner material remains within the chamfer 45. Thus as shown in FIG. 5, this provides a materially increased wall thickness of the liner material in the portions thereof immediately surrounding the port 22, as indicated at 55, which is highly desirable in order to increase the stiffness of these portions of the liner and thus their resistance against line pressure tending to deflect the liner material away from the plug. The final operation in finishing the plug and liner unit is to machine the outer surface of the liner to the proper configuration to fit the bore 11 in the valve body 10. This reduces the wall thickness of the major part of the liner, which is desirable in use since the tendency of the liner material to cold flow in use decreases with the thickness of the wall section. Satisfactory results have been obtained, for example, with the overall thickness of the liner being of the order of 1/8 inch, and the thickness through the several grooves in the plug body will therefore be approximately 3/16 inch.

When this fabricating operation is completed, the finished plug and valve unit has the characteristics illustrated in FIGS. 4 and 5. The liner is locked against both axial and angular movement with respect to the plug by the portions thereof which fill the several indentations in the surface of the plug, and this unit is therefore ready for direct installation in a valve body. In fact, this plug and liner unit is readily applicable to valve bodies originally intended for operation in unlined valves, since it is then necessary only to fabricate the plug initially of sufficiently smaller dimensions than the original plug to allow for the additional thickness of the liner. The resulting unit can even be installed in the field with ease and without requiring special machining or the like, since the liner material is capable of adapting itself to compensate for departures of the plug and bore from the accuracy required in the case of metal to metal contact between the plug and body.

The invention offers desirable features in the use of the finished valve. In particular, the movement of the plug during operation of the valve has a tendency to force the liner material even more tightly into the indentations on the surface of the plug than when the plug is at rest, thus minimizing the possibility of movement of the liner with respect to the plug. This result is also aided by the fact that the liner is essentially in tension on the plug due to shrinkage thereof as it cools during the fabricating operation as described. In addition, with the indentations formed by extended grooves as shown, the stresses on the liner material are distributed over such relatively substantial areas as to minimize the necessity for shear strength in the liner material. From all these standpoints, the invention offers important practical advantages in both the fabrication and use of lined valves.

This application is a continuation of my application Serial No. 707,807, filed January 8, 1958, and said application is in turn a division of my application Serial No. 436,282, filed June 14, 1954, now abandoned, both assigned to the same assignee as this application.

While the methods herein described constitute preferred embodiments of the invention, it is to be understood that the invention is not limited to these precise methods, and that changes may be made therein without departing from the scope of the invention which is defined in the appended claims.

What is claimed is:

1. The method of fabricating a lined plug valve which includes the steps of forming a tapered valve plug having multiple spaced indentations of predetermined depth defining axially and radially extending grooves having a predetermined configuration in the surface thereof, forming a tapered tubular liner of predetermined substantially uniform wall thickness for said plug of a fluorocarbon material having a relatively high coefficient of thermal expansion, heating said liner to an elevated temperature at which said liner is readily deformable, assembling said heated liner and said plug in a tapered mold cavity of substantially the same dimensions as the outside of said heated liner, applying high pressure to the large end of said plug to force said plug and liner into said cavity and to conform the inner surface of said liner with the surface of said plug with accompanying filling of said grooves by the material of said liner to form areas in said liner of substantially different wall thickness, the areas of said liner opposite said grooves being of a thickness substantially greater than the thickness of said liner in the areas thereof between said grooves, cooling said liner while maintaining said pressure thereon to retain the material of said liner in said grooves forming a keyed connection preventing relative movement of said plug and liner both angularly and axially thereof, and finally machining the outer surface of said liner on said plug to predetermined final dimensions in accordance with the corresponding dimensions of the bore in the valve body with which said lined plug is to be used and thereby reducing the wall thickness of a major portion of said liner for minimizing the effects of cold flow thereof.

2. The method of fabricating a lined plug valve which includes the steps of forming a tapered valve plug having multiple spaced axially and circumferentially extending grooves of predetermined depth in a predetermined pattern along the surface thereof, forming a tapered tubular liner of predetermined substantially uniform wall thickness for said plug of a fluorocarbon plastic material having a relatively high coefficient of thermal expansion, heating said liner to an elevated temperature at which said liner is readily deformable, assembling said heated liner at substantially said elevated temperature in a tapered mold cavity of substantially the same dimensions as the outside of said heated liner, then inserting said plug into said heated liner, applying high pressure to the large end of said plug to force said plug and liner into said cavity and to conform the inner surface of said liner with the surface of said plug with accompanying filling of said grooves by the material of said liner to form areas in said liner of substantially different wall thickness thereby increasing the surface area of at least one surface thereof, the areas of said liner overlying said grooves being of a thickness substantially greater than the thickness of the areas of said liner between said grooves, and cooling said liner while maintaining said pressure thereon to retain the material of said liner in said grooves forming a keyed connection preventing relative movement of said plug and liner both angularly and axially thereof, said cooling operation cooperating with said increased surface area to effect distribution of the stresses in said liner over such relatively substantially increased surface area.

3. The method of fabricating a lined plug valve which includes the steps of forming a tapered valve plug having multiple spaced indentations in the surface thereof and a port extending therethrough, chamfering the rim of said port at both ends thereof to form a groove in the surface of said plug surrounding each end of said port, forming a tapered tubular liner of predetermined substantially uniform wall thickness for said plug of a fluorocarbon plastic material having a relatively high coefficient of thermal expansion, heating said liner to an elevated temperature at which said liner is readily deformable, assembling said heated liner and said plug in a tapered mold cavity of substantially the same dimensions as the outside of said heated liner, applying high pressure to the large end of said plug to force said plug and liner into said cavity and to cause the material of said liner to fill said indentations and said groove to form areas in said liner of substantially different wall thickness thereby increasing the surface area of at least one surface thereof, the areas of said liner overlying said indentations and each said groove being of a thickness substantially greater than the thickness in the areas of said liner between said indentations and each groove, cooling said liner while maintaining said pressure thereon to retain the material of said liner in said indentations and grooves forming a permanently keyed connection preventing relative movement of said plug and liner both angularly and axially thereof, and removing the material of said liner opposite said port while retaining said liner material in said grooves to provide a correspondingly greater wall section of said liner surrounding each end of said port, said cooling operation cooperating with said increased surface area of said liner to effect distribution of the stresses in said liner over such relatively substantially increased surface area.

4. In a method of fabricating a lined plug valve which includes a valve body having a transverse bore therein and a valve plug for insertion in said bore having sufficiently smaller radial dimensions than said bore to establish an annular clearance between the opposed surfaces thereof, one of said opposed surfaces having a plurality of spaced indentations of predetermined configuration and depth to define indented and non-indented portions on said one of said opposed surfaces, one of said surfaces being tapered, the radial dimensions of said clearance overlying said indented surface portions being substantially greater than the radial dimensions of said clearance overlying said non-indented surface portions, the steps of forming tubular liner means of a fluorocarbon material having a coefficient of thermal expansion substantially greater than that of said plug and body and with said liner means proportioned to be received in said clearance and initially of greater thickness than the minimum corresponding radial dimensions of said clearance, assembling said liner means in telescoping overlying relation with said indented surface, assembling in telescoping relation with said liner means and said indented surface a member having the same surface contour as the other of said surfaces, and forcing said surfaces axially of each other in the direction of the smaller end of said tapered surface to compress said liner means and cause the material thereof to flow into said indentations forming liner portions overlying and received in said indented surface portions which have radial dimensions substantially greater than the radial dimensions of said liner means in the portions thereof overlying said non-indented surface portions and which are retained in said indentations to maintain said liner means in correspondingly fixed relation with said indented surface both axially and circumferentially thereof.

5. In a method of fabricating a lined plug valve which includes a valve body having a transverse bore therein and a valve plug for insertion in said bore having sufficiently smaller radial dimensions than said bore to establish an annular clearance between the opposed surfaces thereof, one of said opposed surfaces having a plurality of spaced indentations therein of predetermined configuration and depth to define indented and non-indented portions on said one of said opposed surfaces, one of said surfaces being tapered, the radial dimensions of said clearance overlying said indentations being substantially greater than the radial dimensions of said clearance overlying said non-indented portions, the steps of forming a tubular liner sleeve of a fluorocarbon material having a coefficient of thermal expansion substantially greater than that of said plug and body and with said sleeve proportioned to be received in said clearance and initially of greater thickness than the minimum corresponding radial dimensions of said clearance, assembling said sleeve in telescoping overlying relation with said indented surface, assembling in telescoping relation with said sleeve and said indented surface a member having the same surface contour as the other of said surfaces, forcing said surfaces axially of each other in the direction of the smaller end of said tapered surface to compress said sleeve and cause the material thereof to flow into said indentations thereby reducing substantially the thickness of said sleeve in the portions thereof between said indentations for minimizing the effects of cold flow in said sleeve portions of reduced thickness and at the same time providing thicker portions of said sleeve which are retained in said indentations to maintain said sleeve in correspondingly fixed relation with said indented surface both axially and circumferentially thereof.

6. In a method of fabricating a lined plug valve which includes a valve body having a transverse bore therein and a tapered valve plug for insertion in said bore having sufficiently smaller radial dimensions than said bore to establish an annular clearance between the opposed surfaces thereof, one of said opposed surfaces having a plurality of spaced indentations of predetermined configuration and depth therein, the radial dimensions of said clearance overlying said indentations being substantially greater than the radial dimensions of said clearance overlying said non-indented surface portions, the steps of forming tubular liner means of a fluorocarbon material having a coefficient of thermal expansion substantially greater than that of said plug and body and with said liner means proportioned and tapered to be received in said clearance and initially of greater thickness than the minimum corresponding radial dimensions of said clearance, assembling said liner means in telescoping overlying relation with said indented surface, assembling in telescoping relation with said liner means and said indented surface a member having the same surface contour as the other of said surfaces, forcing said surfaces axially of each other in the direction of the smaller end of said tapered liner means to compress said liner means and cause the material thereof to flow into said indentations thereby forming portions of said liner means overlying and received in said indentations which have radial dimensions substantially greater than the radial dimensions of the portions of said liner means overlying said non-indented surface portions and which are retained in said indentations to maintain said liner means in correspondingly fixed relation with said indented surface both axially and circumferentially thereof, said axial force and compression reducing the thickness of said liner means in the portions thereof between said indentations to minimize the effects of cold flow therein.

7. In a method of fabricating a lined plug valve which includes a valve body having a transverse bore therein and a valve plug for insertion in said bore having sufficiently smaller radial dimensions than said bore to establish an annular clearance between the opposed surfaces thereof, one of said opposed surfaces having a plurality of spaced indentations of predetermined configuration and depth to define indented and non-indented portions on said one of said opposed surfaces, one of said surfaces being tapered, the radial dimensions of said clearance overlying said indentations being substantially greater than the radial dimensions of said clearance overlying said non-indented surface portions, the steps of forming tubular liner means of a fluorocarbon material having a coefficient of thermal expansion substantially greater than that of said plug and body and with said liner means proportioned to be received in said clearance and initially of greater thickness than the minimum corresponding radial dimensions of said clearance, assembling said liner means in telescoping overlying relation with said indented surface, assembling in telescoping relation with said liner means and said indented surface a member having the same surface contour as the other of said surfaces, forcing said surfaces axially of each other in the direction of the smaller end of said tapered surface while said liner means is heated to a temperature at which it is readily deformable to compress said liner means and cause the material thereof to flow into said indentations thereby forming in said liner means portions of substantially different wall thickness, the portions of said liner means overlying said indented surface portions being of a thickness substantially greater than the thickness of said liner portions overlying said non-indented surface portions, and retaining said surfaces in the resulting relation while cooling said liner means to cause the material thereof in said indentations to be retained therein and thereby to maintain said liner means in correspondingly fixed relation with said indented surface both axially and circumferentially thereof, said cooling operation cooperating with the increased surface area to effect distribution of the stresses in said liner means over the increased surface area thereof.

8. In a method of fabricating a lined plug valve which includes a valve body having a transverse bore therein and a valve plug for insertion in said bore having sufficiently smaller radial dimensions than said bore to establish an annular clearance between the opposed surfaces thereof, one of said opposed surfaces having a plurality of spaced indentations therein of predetermined configuration and depth to define indented and non-indented portions on said one of said opposed surfaces, one of said surfaces being tapered, the radial dimensions of said clearance overlying said indentations being substantially greater than the radial dimensions of said clearance overlying said non-indented surface portions, the steps of forming tubular liner means of a fluorocarbon material having a coefficient of thermal expansion substantially greater than that of said plug and body and with said liner means proportioned to be received in said clearance and initially of greater thickness than the minimum corresponding radial dimensions of said clearance, heating said liner means to a temperature at which it is readily deformable, assembling said heated liner means in telescoping overlying relation with said indented surface, assembling in telescoping relation with said liner means and said indented surface a member having the same surface contour as the other of said surfaces, forcing said surfaces axially of each other in the direction of the smaller end of said tapered surface to compress said liner means and cause the material thereof to flow into said indentations thereby reducing substantially the thickness of said liner means in the portions thereof between said indentations for minimizing the effects of cold flow therein, and retaining said surfaces in the resulting relation while cooling said liner means to cause the material thereof in said indentations to be retained therein and thereby to maintain said liner means in correspondingly fixed relation with said indented surface both axially and circumferentially thereof, said indentations on said one of said opposed surfaces operating to increase substantially the surface area of the adjacent surface of said liner means to effect distribution of the stresses in said liner means over the resulting increased surface area.

References Cited in the file of this patent

UNITED STATES PATENTS

| | | |
|---|---|---|
| 2,684,504 | Sell | July 27, 1954 |
| 2,718,665 | Clade | Sept. 27, 1955 |
| 2,729,420 | Schenck | Jan. 3, 1956 |